(12) United States Patent
Simitci et al.

(10) Patent No.: US 7,970,861 B2
(45) Date of Patent: Jun. 28, 2011

(54) LOAD BALANCING IN A DISTRIBUTED COMPUTING ENVIRONMENT

(75) Inventors: Huseyin Simitci, Maple Valley, WA (US); Aaron W. Ogus, Redmond, WA (US); Ramesh Shankar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/620,778

(22) Filed: Nov. 18, 2009

(65) Prior Publication Data

US 2011/0119328 A1 May 19, 2011

(51) Int. Cl.
*G06F 15/16* (2006.01)
*G06F 15/173* (2006.01)

(52) U.S. Cl. .................................. 709/217; 709/224
(58) Field of Classification Search .......... 709/223–226, 709/217

See application file for complete search history.

(56) References Cited

U.S. PATENT DOCUMENTS

| | | | |
|---|---|---|---|
| 7,020,698 B2 | 3/2006 | Andrews | |
| 7,284,067 B2 | 10/2007 | Leigh | |
| 7,616,640 B1 * | 11/2009 | Sitaraman et al. | 370/395.1 |
| 7,707,295 B1 * | 4/2010 | Szeto et al. | 709/229 |
| 7,716,419 B2 * | 5/2010 | Kashima et al. | 711/114 |
| 7,779,416 B2 * | 8/2010 | Koga et al. | 718/105 |
| 2003/0065763 A1 | 4/2003 | Swildens | |
| 2008/0275949 A1 | 11/2008 | Shen | |
| 2009/0144285 A1 | 6/2009 | Chatley | |

OTHER PUBLICATIONS

Wokoma, Ibiso et al., "A Weakly Coupled Adaptive Gossip Protocol for Application Level Active Networks", Department of Electronic and Electrical Engineering, University of London, Torrington Place, London, Published 2002, 4 pages, http://kar.kent.ac.uk/13679/1/GossipWokoma.pdf.

Smith, Warren, "Prediction Services for Distributed Computing", Texas Advanced Computer Center, The University of Texas at Austin, Published Mar. 26-30, 2007, 10 pages, http://ieeexplore.ieee.org/stamp/stamp.jsp?arnumber=04228004.

Khazan, Roger I., "Group Communication as a Base for a Load-Balancing Replicated Data Service", Department of Electrical Engineering and Computer Science, Massachusetts Institute of Technology, Published May 1998, 111 pages, http://reference.kfupm.edu.sa/content/m/u/multicast_group_communication_as_a_base_268258.pdf.

Di, Sheng, et al., "Gossip-based Dynamic Load Balancing in a Self-organized Desktop Grid", The University of Hong Kong, Pokfulam Road, Hong Kong, 8 pages, http://i.cs.hku.hk/~clwang/papers/HPCAsia09-gossip.pdf, May 22, 1998.

* cited by examiner

*Primary Examiner* — Hussein A Elchanti
(74) *Attorney, Agent, or Firm* — Shook Hardy & Bacon LLP

(57) ABSTRACT

Systems, methods, and computer storage media for load balancing at a client device in a distributed computing environment based on a dynamic validity duration and utilization metrics of one or more data stores are provided. The client device selects a data store from a plurality of data stores that each maintains a copy of a datum. The selection of data stores by a client is based on utilization metrics of the data stores. The utilization metrics are stored at the client. A data store determines if a request for a particular datum may be fulfilled within a validity period associated with a request from the client. The validity period is dynamically changed by the client across multiple requests to aid in the load balancing process. Additionally, a gossip protocol may be used to propagate utilization metrics of a plurality of data stores across the system.

20 Claims, 10 Drawing Sheets

TIME₂

LOAD BALANCING IN A DISTRIBUTED COMPUTING ENVIRONMENT

BACKGROUND

Typically, a distributed computing environment includes a number of data stores that maintain a copy of a particular datum. The multiple copies of a particular datum across a number of data stores achieve redundancy, which increases reliability and durability of a distributed computing system. Because a number of copies or instances of a particular datum are located within a system, an opportunity exists to balance the load on the system by selecting a particular data store or instance of the datum from a group of potential candidates.

SUMMARY

Embodiments of the present invention relate to systems, methods, and computer storage media for load balancing at a client device in a distributed computing environment based on a dynamic validity period and/or utilization metrics of one or more data stores. At a client device, a data store is selected from a plurality of data stores that maintain a copy of a particular datum. The client device has utilization metrics, received from one or more data stores, describing utilization of resources within the data store(s). The client device selects the data store based, at least in part, on the utilization metrics. A request is communicated from the client device that includes a validity (i.e., valid) period and/or a utilization metrics. The request is a request to the data store from the client for the particular datum. The client receives, from the data store, a response to the request. The response indicates an inability of the data store to fulfill the first request within the validity period. As a result of receiving the response to the request, the client selects another data store from the plurality of data stores. The client may rely on utilization metrics to select the next data store. The client communicates another request for the particular datum to the next data store. This subsequent request has a validity period with a duration that may differ from the previous duration.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
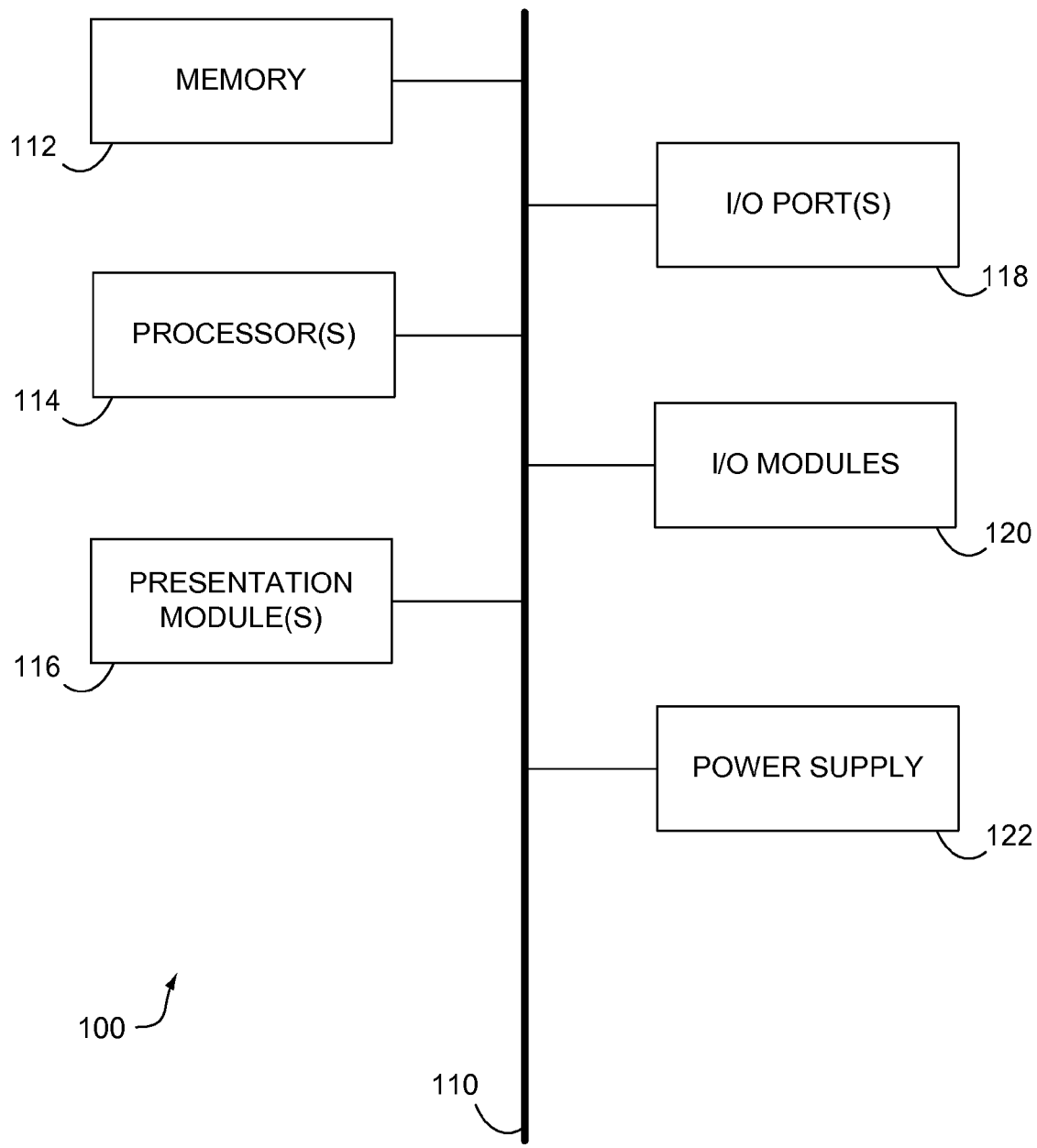
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods and computer storage media for load balancing at a client device in a distributed computing environment based on a dynamic validity period and/or utilization metrics of one or more data stores. At a client device, a data store is selected from a plurality of data stores that maintain a copy of a particular datum. The client device has utilization metrics, received from one or more data stores, describing utilization of resources (e.g., performance of resources, operating characteristics of resources) within the data store(s). The client device selects the data store based, at least in part, on the utilization metrics. A request is communicated, from the client that includes a valid period and/or a utilization metrics. The request is a request to the data store from the client for the particular datum. The client receives, from the data store, a response to the request. The response indicates an inability of the data store to fulfill the first request within the validity period. As a result of receiving the response to the request, the client selects another data store from the plurality of data stores. The client may rely on utilization metrics to select the next data store. The client may then communicate another request for the particular datum to the next data store (or a previous data store). This subsequent request has a validity period with a duration that may differ from the previous duration.

Accordingly, in one aspect, the present invention provides a method for load balancing at a client device in a distributed computing environment based on a dynamic validity period and utilization metrics. At the client device, a first data store is selected from a plurality of data stores that maintain a copy of a particular datum. The client device maintains utilization metrics describing utilization of resources within the first data store. The method includes communicating a first request having a valid period of a first duration. The first request is a request to the first data store from the client for the particular datum. The method includes receiving, from the first data store, a first response to the first request. The first response indicates an inability of the first data store to fulfill the first request within the first duration. In response to receiving the first response to the first request, indicating an inability to fulfill the request within the first duration, the method includes selecting a second data store from the plurality of data stores. The method also includes communicating a second request for the particular datum to the second data store. The second request has a valid period with a second duration.

In another aspect, the present invention provides a computer storage media having computer-executable instructions embodied thereon, that when executed by a computing system having a processor and memory, cause the computing system to perform a method for load balancing at a client device in a distributed computing environment with utilization metrics of a plurality of data stores. At a first data store in the distributed computing environment, the method includes receiving a first request from a first client. The request includes utilization metrics of a second data store. The method also includes storing utilization metrics of the second data store at the first data store. At the first data store, the method includes receiving a second request from a second client. In response to the second request, the method includes communicating, from the first data store to the second client, utilization metrics for use in load balancing at the second client. The utilization metrics include utilization metrics of the first data store and utilization metrics of the second data store.

A third aspect of the present invention provides a method for load balancing at a client device in a distributed computing environment based on a dynamic validity duration and utilization metrics. At a client device, the method includes receiving a request from a service for a datum. The datum is data used as part of a service available by way of the distributed computing environment. The method includes identifying a first data store to serve the datum. The first data store is identified from a plurality of data stores based on utilization metrics of the first data store that are stored at the client device. The method includes communicating a first request for the datum to the first data store. The first request includes a validity period with a first duration. The method also includes receiving a response to the first request as a result of the first data store predicting that the first request would be unable to be fulfilled within the first duration. The first response includes utilization metrics of one or more of the plurality of data stores. The method includes identifying a second data store to serve the datum. The second data store is identified based, at least in part, on utilization metrics of at least one of the plurality of data stores. The method also includes communicating a second request for the datum to the second data store. The second request includes a validity period with a duration longer than the first duration.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
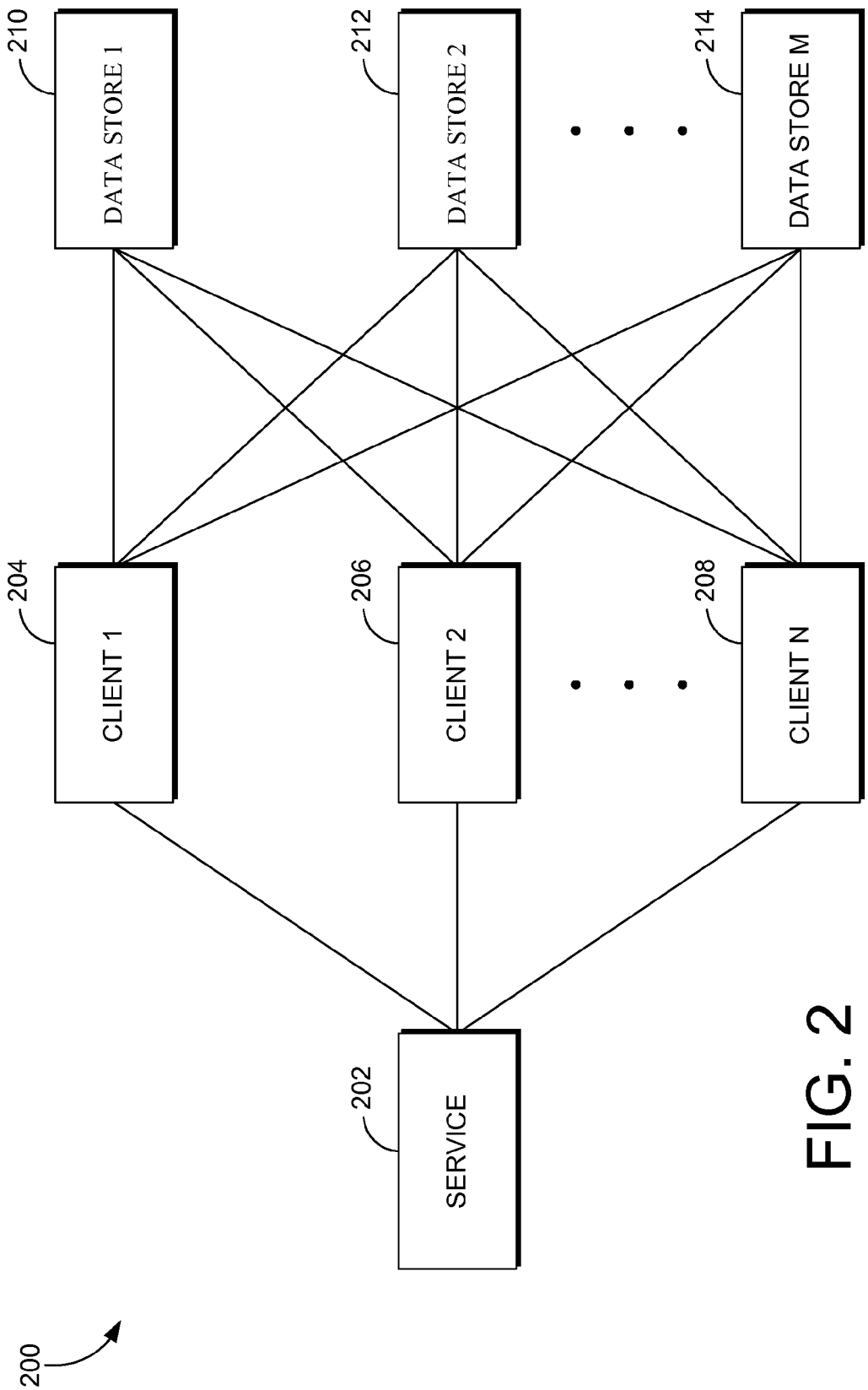
FIG. 2 depicts an exemplary distributed computing environment in which embodiments of the present invention may be employed.

With reference to FIG. 2, a block diagram is provided illustrating an exemplary distributed computing environment 200 in which embodiments of the present invention may be employed. It should be understood that this and other arrangements described herein are set forth only as examples. Other arrangements and elements (e.g., machines, services, clients, data stores, interfaces, functions, orders, and grouping, etc.) can be used in addition to or instead of those shown, and some elements may be omitted altogether. Further many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the distributed computing environment 200 may include a service 202, a client-1 204, a client-2 206, a client-n 208, a data store-1 210, a data store-2 212, and a data store-m 214. Each of the components shown in FIG. 2 may be any type of computing device, such as computing device 100 described with reference to FIG. 1, for example. The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of services, clients, and/or data stores may be employed within the system 200 while staying within the scope of the present invention. Additionally, other component not shown may also be included within the system 200. Further, it is contemplated that a distributed computing environment encompasses and includes a distributed storage environment.

The service 202 is a functionality, role, application, or the like that operates within the distributed computing environment 200. For example, a service may include a program or functional component that is utilized by a user of a distributed computing environment to access or store data within the distributed computing environment. In an exemplary embodiment of the present invention, a request for data is generated at the service 202. The request may be generated as a result of a user or other entity utilizing the distributed computing environment to perform functional tasks including the storing and retrieving of data. The service 202 may be in communication with a fabric controller (not shown) or other controlling component that monitors, maintains, and controls the distributed computing environment 200. As a result, a request for data is communicated from the service 202 to one or more clients.

A client, in an exemplary embodiment, is a front-end server that controls, monitors, and/or assists one or more back-end servers. For example, a front-end server may receive data access commands from external sources, such as a service. As a result of receiving these commands, the front-end server may then relay those commands or new commands to back-end servers to read or write data. Therefore, in an exemplary embodiment, the client-1 204, the client-2 206, and the client-n 208 are front-end servers to one or more data stores. In this example, a client is responsible for selecting from a plurality of data stores to retrieve or store data.

For example, an exemplary distributed computing environment commits a datum (or the plurality of datum as data) to multiple data stores to achieve redundancy, reliability, performance, and durability. The datum may be committed to three different data stores in an example. This results in three copies of the same datum available within the distributed computing environment. Therefore, while the datum, when requested, may be retrieved from any one of the data stores maintaining a copy, an opportunity exists to select a particular data store. The selection may be done to achieve performance optimization, load balancing, resource cost optimization, or to achieve other factors as will be discussed herein.

An exemplary embodiment includes using performance information, such as utilization metrics, of a data store to make a determination if that data store should be selected for storing or serving the data. Additionally, an exemplary embodiment includes selecting a data store based on dynamic information, such as dynamically adjusted time-out periods for a request. Each of these embodiments will be discussed in greater detail hereinafter.

Returning to FIG. 2, the data store-1 210, the data store-2 212, and the data store-m 214, in an exemplary embodiment, are back-end servers. For example, a data store may be comprised of one or more computer-readable media, such as hard-disk drives, Random Access Memory ("RAM"), solid state non-volatile memory, or the like. Data to be stored within the distributed computing environment 200 is ultimately maintained for later access at a data store. Therefore, a data store may be comprised of multiple disks and/or computer-readable media.

In an exemplary embodiment of the present invention, a data store monitors and stores utilization information of the data store. For example, the utilization metrics may include information specific to the data store as a whole or the utilization information may be at a finer level of granularity to be specific to a particular computer-readable media of the data store. Examples of utilization metrics at a data store level include, but are not limited to, a percentage of the Central Processing Unit ("CPU") being utilized, a percentage of the memory of the data store being utilized, an overall disk (e.g., disc) usage of the data store being utilized, and a percentage of network usage. It is contemplated that additional metrics similar to those identified above may be monitored and stored. For example, instead of monitoring and storing relational values, such as percentages, absolute values may instead be monitored. Examples include megabytes, gigabytes, terabytes, or the like.

Additional examples of utilization metrics that may be monitored and stored for a particular data store include metrics at a finer level of detail. For example, a data store may be comprised of a number of computer-readable media (e.g., hard-disk drives, Flash memory, RAM). The utilization metrics, in an exemplary embodiment maintain information about each of the computer-readable media. For example, the utilization metrics include, but are not limited to, an average input/output operation ("I/O") size, an average latency of an I/O, an average queue depth (pending I/O), throughput value, and/or I/O's per time period.

The utilization metrics, regardless if they are directed to the data store as a whole or a specific computer-readable memory, may be used to calculate a work score. A work score is a value calculated with one or more of the utilization metrics in an attempt to evaluate and compare the various data stores or the various memories for purposes of the present invention.

As indicated by the exemplary distributed computing environment 200 of FIG. 2, the client-1 204 is not in direct statistical information communication with the client-2 206 as represented by the lack of connecting lines. However, each of the clients may be able to connect to a common data store to share statistical information. Similarly, the data store-1 210 and the data store-2 212 are not in direct statistical information communication with one another as represented by a lack of a solid line between the two data stores. However, each of the data stores may be able to communicate statistical information with a common client as indicated by the solid lines.

For example, the data store-1 210 is able to communicate statistical information with both the client-1 204 and the client-2 206 as illustrated by the connecting solid lines. Data stores may be in direct communication with one another for information other than statistical information. For example, replication of data among various data stores may be accomplished through the direct communication between the various data stores. It is contemplated that a similar channel of communication may be utilized to disseminate statistical information directly amongst data stores.

This distinction that the various clients are not in direct communication with one another and that the various data stores are not in direct communication with one another exemplifies a need for a protocol for communicating utilization metrics among the various indirectly connected components. A protocol, such as a gossip protocol to be discussed later, may offer the ability to timely share utilization metrics among the various components to facilitate load balancing operations.

In an exemplary embodiment, a client, a front-end server, a data store, and/or the like may merely be software divisions. In this example a software division may exists within one or more common physical devices. For example, a client and a data store may reside within a common hardware cluster. Therefore, it is contemplated herein, devices, servers, clients, or data stores may in fact be physically combined while being functionally distinct.

Figure 3:
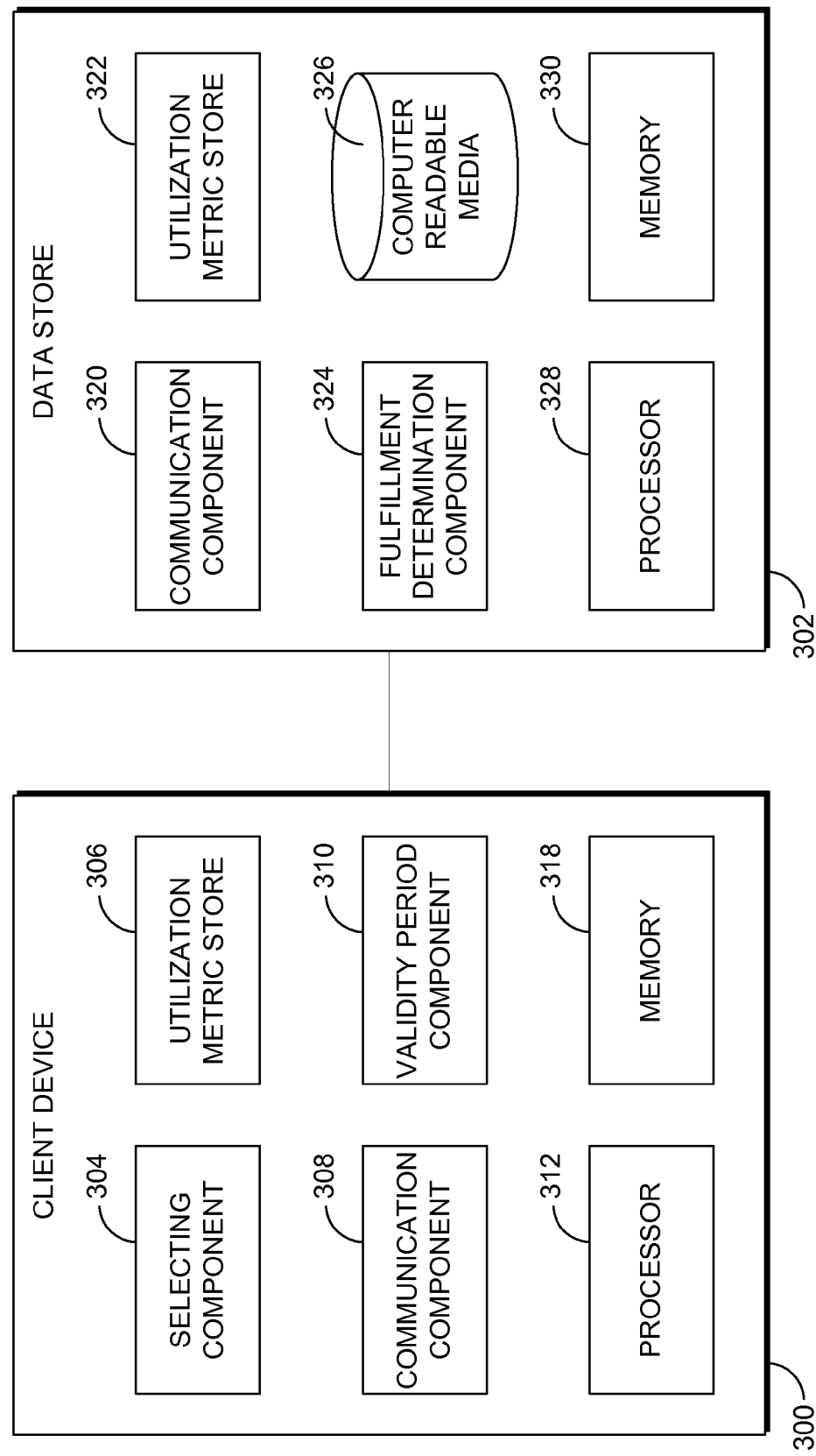
FIG. 3 depicts an exemplary client device and an exemplary data store in accordance with embodiments of the present invention.

FIG. 3 depicts a client device 300 and a data store 302 in accordance with an embodiment of the present invention. The client device 300 is a computing device having a processor 312 and memory 318. In an exemplary embodiment, the client device 300 is a front-end server in a distributed computing environment, where the client device 300 is functional to communicate requests for data to one or more data store. Because the client device 300 typically provides requests to a data store, the client is referred to as the "client" of the data store. As previously discussed with respect to FIG. 2, a client device may receive a call, command, or request for a datum stored at multiple back-end servers. Therefore, in an exemplary embodiment, the client device 300 determines to which of the possible data stores the request for the datum is communicated. In an embodiment, a random or pseudo-random methodology is implemented when selecting an appropriate data store out of a plurality of data store that maintain copies of the datum. However, in an exemplary embodiment, random selection of a data store fails to achieve or try to achieve optimal data store utilization. As such, it is advantageous, in an embodiment, to implement utilization metrics and/or a dynamic validity period of a request when selecting a data store.

Each of the components/devices shown in FIG. 3 may be any type of computing device, such as computing device 100 described with reference to FIG. 1, for example. The components may communicate with each other via a network. It should be understood that any number of components, devices, processors, memory stores, and/or computer-readable media may be implemented within either the client device 300 or the data store 302 while staying within the scope of the present invention. Additionally, other component not shown may also be included within the client device 300 or the data store 302.

In addition to the processor 312 and the memory 318, the client device 300 includes a selecting component 304, a utilization metric store 306, a communication component 308, and a validity period component 310. The selecting component 304 is a component functional to select one or more data stores that maintain a particular datum. For example, a copy of a particular datum is maintained at three (or more) data stores within a distributed computing environment. The selecting component 304 is responsible for selecting to which of the three data store in this example should have a datum communicated. Therefore, the selecting component 304 may rely on a random algorithm and/or a determination based on one or more utilization metrics. In an exemplary embodiment, the utilization metrics include computed metrics, such as a work score previously discussed.

The utilization metric store 306 is a memory store for maintaining one or more utilization metrics for one or more data stores. For example, the selecting component 304 may rely on utilization metrics stored in the utilization metric store 306 when selecting a data store to which a request for datum is to be communicated. Among other information previously discussed, a time stamp may be associated with one or more of the utilization metrics. A time stamp, in one embodiment, is an indicator of a time at which the associated data expires. In yet another example, a time stamp indicates a time at which the associated data was created. Therefore, in general, a time stamp allows for stale data to be identified and removed from consideration by one or more functions. For example, utilization metrics associated with stale information (e.g., the time stamp has expired) may not be considered when selecting a data store at the selecting component 304. Additionally, in another exemplary embodiment, stale utilization metrics may not be propagated through a distributed computing environment to prevent the further dissemination of stale information. Further yet, it is contemplated that stale utilization metrics are purged from memory once they have been identified, either manually or automatically, as being stale.

The communication component 308 is functional to communicate with one or more components of a distributed computing environment. For example, the communication component facilitates communicating among the client device 300 and the data store 302. In an additional exemplary embodiment, the communication component may facilitate communication among one or more services of a distributed computing environment. For example, facilitating of communication includes sending and receiving of information, data, commands, and requests. In an exemplary embodiment, the communication component 308 communicates a request for a datum from the data store 302. Further, in this exemplary embodiment, the communication component 308 is able to receive a response from the data store 302.

The validity period component 310 is functional to establish a validity period (i.e., duration of time for which a request is valid) for a request to a data store. In an exemplary embodiment, an initial request for a datum includes a time-out period of a first duration. For example, after the first duration expires, the request is no longer valid. Therefore, an embodiment of the present invention utilizes a dynamic validity period with subsequent requests.

For example, a datum to be requested is stored at three different data stores. The selecting component 304 may select a first data store based on utilization metrics stored in the utilization metric store 306. After the first data store is selected, the communication component 308 sends a request for the datum to the first data store. The request includes a validity period of a first duration. The validity period of a first duration is determined by the validity period component 310. In an exemplary embodiment, the first duration is of a small duration (e.g., 10 milliseconds) as compared to later requests for the data. The validity period component 310 may determine the first duration based on one or more utilization metrics of the one or more data stores that maintain a copy of the requested datum.

For example, if two data stores with similar utilization metrics maintain a copy of the data, the first duration may be short as the validity period component 310 has identified another, similarly situated, data store that may be able to serve the same datum if it is unavailable at the first data store. Therefore, it is contemplated that requests for datum may be optimized by providing short validity periods for requests to allow subsequent data stores an opportunity to fulfill the request. However, in an exemplary embodiment, the validity period component 310 may provide a longer validity period if a request for the data has previously expired or the alternative data stores do not provide much potential for fulfilling the request. Therefore, the validity period component 310 dynamically adjusts the validity period associated with requests for datum based on one or more factors.

It is contemplated that in addition to those factors already discussed, the validity period component 310 may use one or more other factors. For example, the validity period component 310 may analyze the previous validity periods and any information included with responses from data store in response to a request. Further, the validity period component 310 may analyze utilization metrics of the potential or previously attempted data stores. Additionally, the validity period component 310 may also follow one or more predefined rules when establishing a validity period. Examples of predefined rules include identifying the number of potential data stores to serve the datum and establishing a short (e.g., 10 millisecond) validity period for all but the last data store. If the request is not fulfilled prior to the last data store, the validity period component 310 may establish a longer (e.g., 1 second, infinity) validity period for a resulting request. In this example, the validity period component 310 attempts to minimize the potential delay at each of the data stores prior to the last data store. It is contemplated that the predefined rules may include a variety of concepts such as a linear model, an exponential model, a logarithmic model, a stair-step model, or the like. Similarly, it is contemplated that the predefined rules may be unique to each client device, data store, or grouping of each.

The data store 302 is comprised of a communication component 320, a utilization metric store 322, a fulfillment determination component 324, a computer-readable media 326, a processor 328, and memory 330.

The communication component 320 facilitates communication among one or more components of a distributed computing environment. In an exemplary embodiment, the communication component 320 is functional to receive a request, communicate data, communicate utilization metrics, and communicate responses. In an exemplary embodiment, the communication component 320 receives a request for datum from the client device 300. In response to the received request, the communication component 320 may communicate the requested data or a response that the requested data cannot be fulfilled within the validity period associated with the request. Further, it is contemplated that the communication component 320 also communicates one or more utilization metrics of one or more data stores including the data store 302.

The utilization metric store 322 stores one or more utilization metrics. In an exemplary embodiment, the utilization metric store 322 stores one or more utilization metrics related to the data store 302 as well as one or more additional data stores. As previously discussed, the utilization metrics may include measurements related to the data store 302 as a whole (e.g., processor utilization percentage, memory utilization percentage, network utilization percentage) and the utilization metrics may include measurements related to specific memory (e.g., average I/O size, average latency of 110, average queue depth). Additionally, as previously discussed, the utilization metric store 322 may also maintain utilization metrics for other data stores. For example, a gossip protocol may be implemented to share utilization metrics among components of a distributed computing environment. As a result of the gossip protocol (or a similar concept), the utilization metric store 322 may maintain utilization metrics of one or more data stores other than the data store 302. A gossip protocol is a communication dissemination technique that utilizes element to element (e.g., computer, node, component) communications that results in an epidemic-type propagation of information and data. A gossip protocol allows a first node to communicate with a second node that has previously communicated with a third node. As a result of the previous communication between the second and third nodes, the first node is aware of information provided by the third node without direct communication between the first and third nodes.

The fulfillment determination component 324 is functional to determine if a request may be fulfilled within an associated validity period. In an exemplary embodiment, a request for data is associated with a validity period. The fulfillment determination component 324 is able to identify the validity period and determine if the request may be fulfilled within the provided duration. In an exemplary embodiment, if the fulfillment determination component 324 determines that a request cannot be fulfilled within the validity period, a response providing an indication is communicated to the requesting client device.

The fulfillment determination component 324, in an exemplary embodiment, provides a predictive determination that the request may not be fulfilled within an associated validity period. A predictive determination is one that predicts that the resources of the data store are insufficient to satisfy the request within a given period of time. The predication may be based, at least in part, on one or more utilization metrics stored in the utilization metric store 322. A predictive determination allows for a prediction that a request will be unable to be completed within a predefined time, which allows the avoidance of scheduling work that may not be completed within the desired time. For example, when work (e.g., a request) is scheduled at a data store without the aid of a predictive determination, the work may progress to a point where it is not able to be cancelled at the data store, but it still will not be completed within the predefined time. Therefore, in this example, time and resources are expended that could have otherwise been avoided with a predictive determination.

A predictive determination, in an embodiment, allows for further optimization in a distributed computing system as the full validity period is not required to expire before attempting to attain the requested datum at an alternative data store. In an additional exemplary embodiment, the fulfillment determination component 324 provides a response to a requesting client device upon the expiration of a validity period and therefore not utilizing predictive techniques. Further, it is contemplated that any combination of predictive or expiration determinations may be implemented within the fulfillment determination component 324.

In an exemplary embodiment, the fulfillment determination component 324 may take into consideration an average queue depth multiplied by an average I/O's service duration minus an associated validity period to determine if the requested datum may be fulfilled within the validity period (i.e., if the resulting value is positive then the request may not be fulfilled within the valid period). It is contemplated that other utilization metrics may be relied upon by the fulfillment determination component 324 when providing a response to a request.

The computer-readable media 326 is a memory store for storing data. In an exemplary embodiment, the data requested by a client is stored in the computer-readable media 326. The computer-readable media 326 may also include data necessary to achieve functionality of the data store 302, such as an operating system, drivers, or the like.

Figure 4:
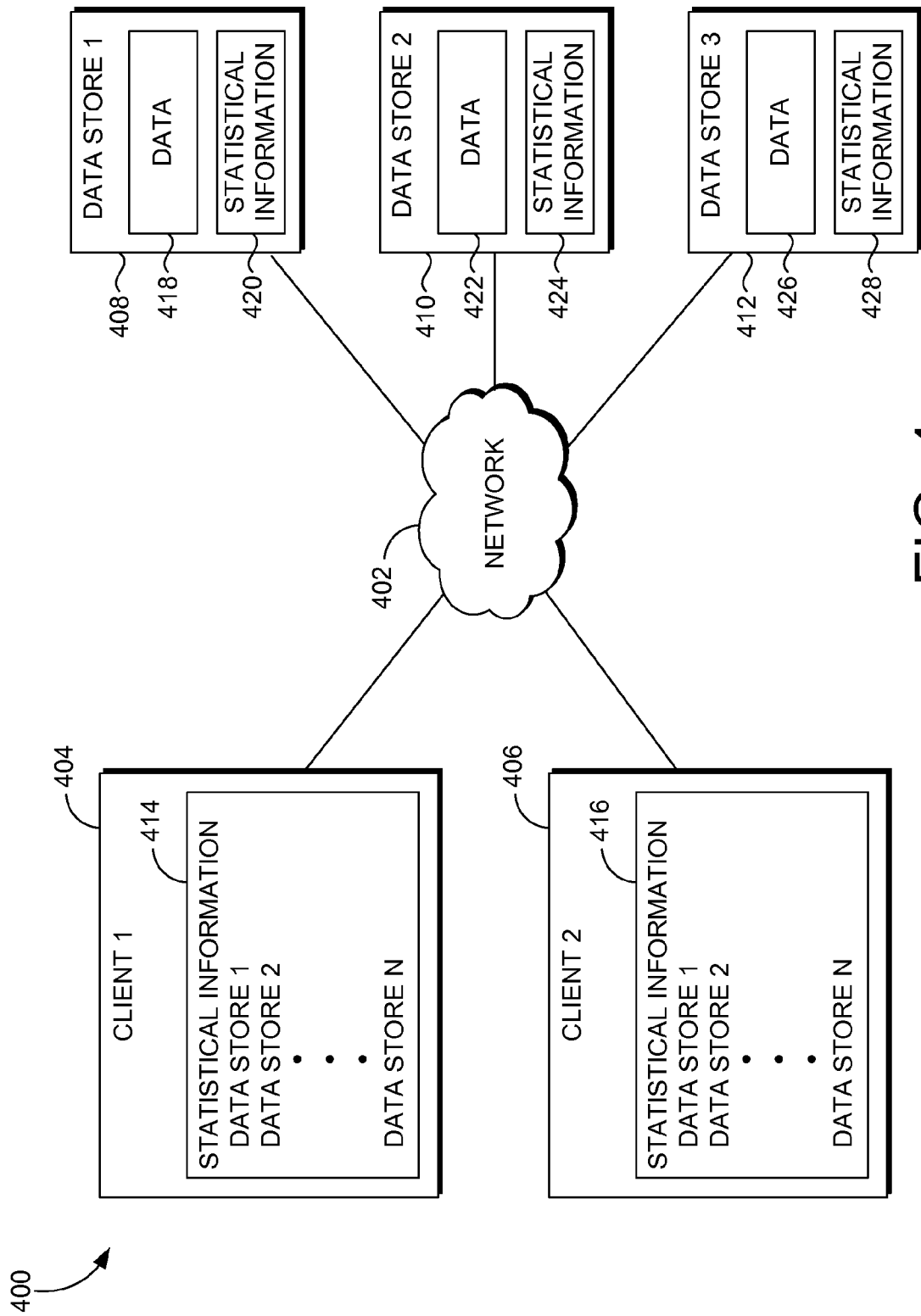
FIG. 4 depicts an exemplary system for load balancing data access within a distributed computing environment in accordance with embodiments of the present invention.

FIG. 4 depicts an exemplary system 400 for load balancing data access within a distributed computing environment in accordance with an embodiment of the present invention. The system 400 includes a client-1 404, a client-2 406, a network 402, a data store-1 408, a data store-2 410, and a data store-3 412. The components of the system 400 may communicate with each other via the network 402, which may include, without limitation, one or more local area networks (LANs) and/or wide area networks (WANs). It should be understood that any number of clients and/or data stores may be employed within the system 400 while staying within the scope of the present invention. Additionally other components not shown may also be included within the system 400.

The client-1 404 includes statistical information 414 of one or more data stores. The statistical information may include utilization metrics of the one or more data stores. Similarly, the client-2 406 includes statistical information 416, which includes statistical information of one or more data stores. A client, such as the client-1 404 or the client-2 406 may rely on the statistical information 414 and the statistical information 416 respectively when selecting a data store to which a request for datum will be sent. Similarly, the statistical information may be utilized for purposes of requesting additional resource to be assigned to a particular service or datum.

As will be discussed in more detail at FIGS. 5-7, the statistical information 414 and the statistical information 416 may be populated utilizing a gossip type protocol. In an additional exemplary embodiment, the statistical information may be populated as a result of responses provided by data stores to requests. The responses may include utilization metrics particular to the responding data store. As such, it is contemplated that the statistical information maintained by a client may only be populated based on direct communication between the client and the data store. However, it is also contemplated that the statistical information stored at a client is populated based on indirect communication among various components of the system 400 that results in the propagation of information.

The data store-1 408 includes data 418 and statistical information 420. The data 418 includes data a client may request on behalf of a service in a distributed computing environment. In an exemplary embodiment, the statistical information 420 includes utilization metrics particular to the data store-1 408. In an additional exemplary embodiment, the statistical information 420 includes utilization metrics related to one or more other data stores.

The data store-2 410 includes data 422 and statistical information 424. Similarly, the data store-3 412 includes data 426 and statistical information 428. The data 422 and the data 426 each hold data that may be requested by a service of a distributed computing environment. The statistical information 424 and the statistical information 428 include statistical information related to an associated data store. In an exemplary embodiment, the statistical information 424 and the statistical information 428 include utilization metrics of one or more additional data stores, which may be different for the statistical information 424 and the statistical information 428.

In an exemplary embodiment, a client, such as the client-1 404 may identify that data servers maintaining copies of a particular datum have utilization metrics above a predefined threshold. Therefore, the client may communicate a request to a management node (not shown) of the distributed computing environment to duplicate the datum to another, less heavily loaded, data store. Therefore, the utilization metrics of the data stores may not only be used when selecting an appropriate data store to retrieve data, but also to enhance the ability of balancing the load of the system through the identification of needed replication. Similarly, it is contemplated that a data store may access utilization metrics to determine if a replication of data at one memory store within the data store should be replicated to another memory store of the data store. This replication would relieve internal work-load pressures and provide a faster response time.

Further, in an exemplary embodiment of the present invention, XStream, which is available from Microsoft Corporation of Redmond, Wash., is an exemplary system for storing a data stream in a distributed computing environment, which may be implemented in conjunction with various embodiments discussed herein.

Figure 5:
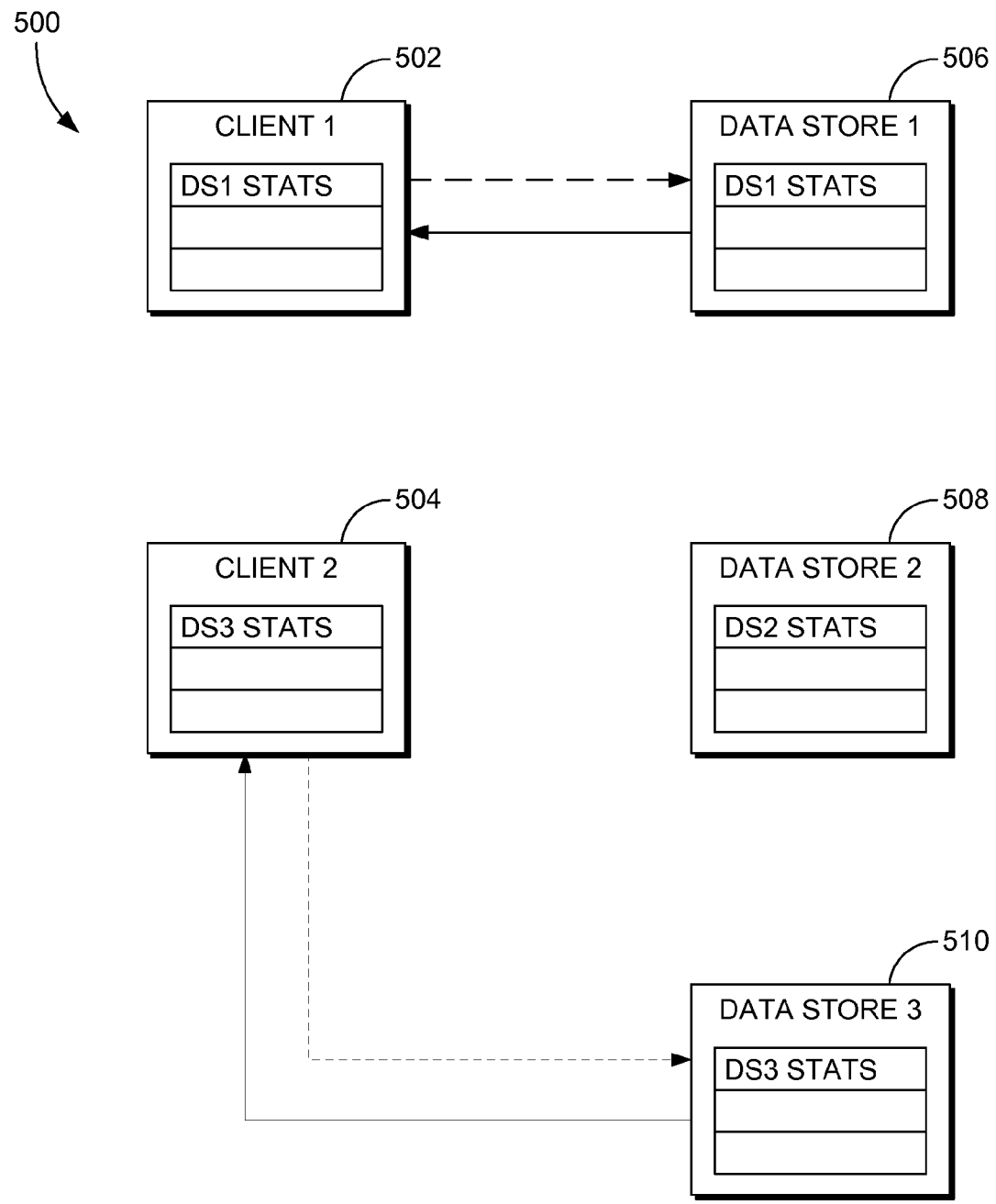
FIG. 5 depicts an exemplary environment for sharing utilization metrics at a first time in accordance with an embodiment of the present invention.

FIG. 5 depicts an exemplary environment 500 for sharing utilization metrics at a first time in accordance with an embodiment of the present invention. The environment 500 includes a client-1 502, a client-2 504, a data store-1 506, a data store-2 508, and a data store-3 510. Each of the clients and data stores of the environment 500 are able to maintain utilization metrics. For example, the data store-1 506 includes utilization metrics of itself as indicated by the "DS1 STATS" illustrated therein. The data store-2 508 includes utilization metrics of itself as illustrated therein with the "DS2 STATS." Similarly, the data store-3 510 includes utilization metrics of itself as indicated therein as "DS3 STATS."

The environment 500 illustrates a request being communicated from the client-1 502 to the data store-1 506 as indicated by the dashed line. Similarly, a response is also indicated by a solid line. In an exemplary embodiment, the response from the data store-1 506 to the client-1 506 includes utilization metrics of the data store-1 506. As a result, the client-1 502 is able to store the utilization metrics of the data store-1 506 for later dissemination or use. This exchange of information allows for the client-1 502 to have information about the data store-1 506 that would otherwise be unknown or unavailable to the client-1 502. For example, the client-1 502 would typically not have a way to measure CPU percentage, memory percentage, overall disk usage percentage, or network usage percentage of a data store. Let alone other internal utilization metrics of a data store, such as average I/O size, the average latency of an I/O, the average queue depth, an average throughput value, etc.

A similar communication of utilization information is illustrated among the client-2 504 and the data store-3 510. As a result of a request (dashed line) being received by the data store-3 510, a response is provided (solid line) to the client-2 504. The response is accompanied by or includes utilization metrics of the data store-3 510.

The environment 500 illustrates a direct communication protocol for disseminating utilization metrics. In this example there is a one-to-one relationship between the information maintained by a client and the data stores to which the client has had direct communication. As a result, each client only includes, utilization metrics of a data store to which the client has had direct communication. However, it is contemplated, as will be discussed at FIGS. 6 and 7, that in addition to communicating information in a response from a data store to a client that includes only utilization metrics of the responding data store, the response may also include utilization metrics of other data stores. Further, it is contemplated that a request from a client to a data store may also include utilization metrics of the data stores in an effort to propagate the utilization metrics thought the environment 500.

Figure 6:
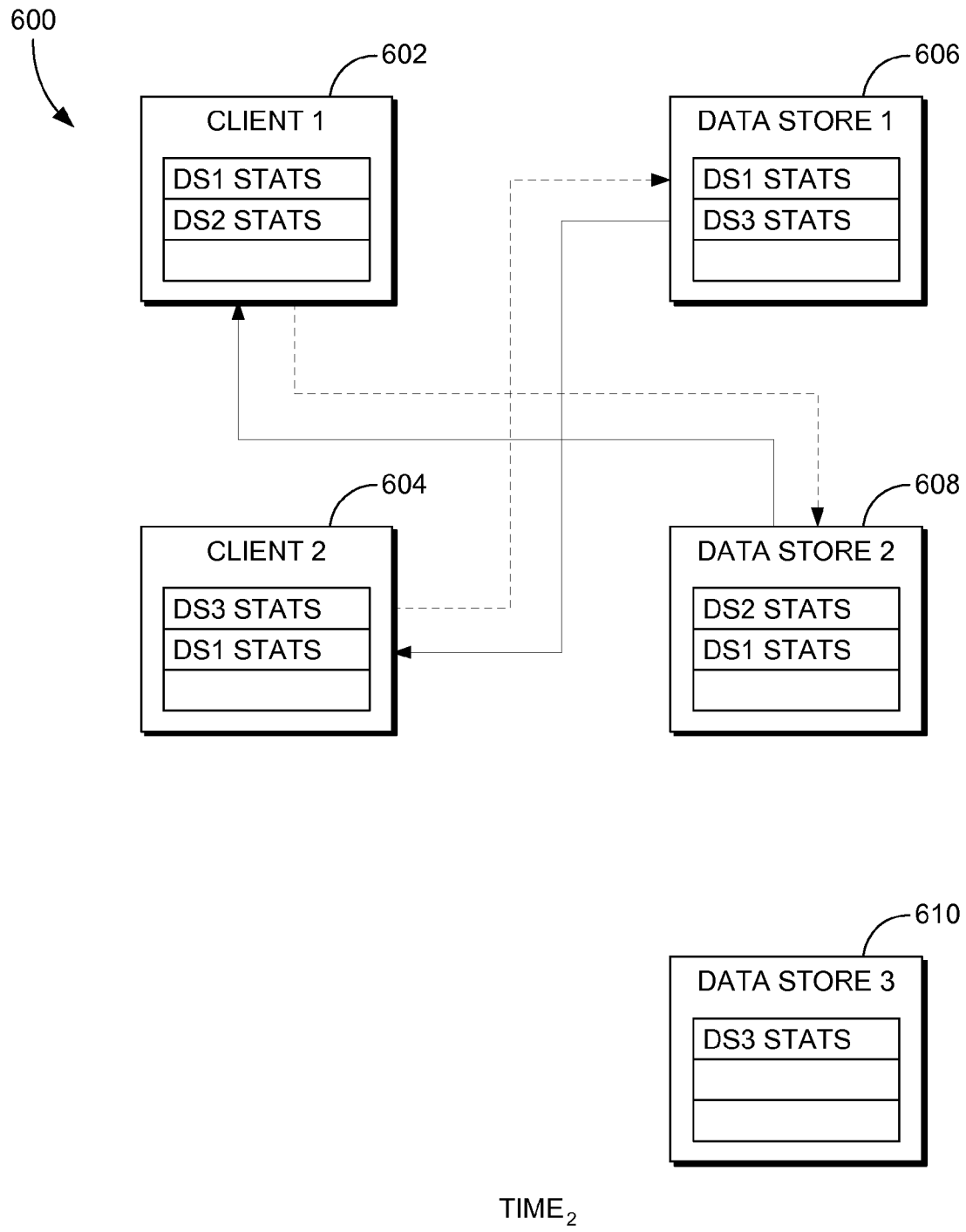
FIG. 6 depicts an exemplary environment for sharing utilization metrics at a second time in accordance with an embodiment of the present invention.

FIG. 6 depicts an exemplary environment 600 for sharing utilization metrics at a second time in accordance with an embodiment of the present invention. The environment 600 includes a client-1 602, a client-2 604, a data store-1 606, a data store-2 608, and a data store-3 610. The environment 600 is at a second time that is subsequent to the first time of FIG. 5. Therefore, utilization metrics previously communicated in the environment 500 of FIG. 5 are still illustrated, but additional requests and responses have occurred as of the second time of environment 600.

For example, the client-1 602 communicated a request to the data store-2 608 as indicated by the dashed line. The data store-2 608 received with the request, utilization metrics of the data store-1 606 that were previously maintained at the client-1 602 from a previous communication interaction with the data store-1 606. Therefore, even thought the data store-2 608 has not communicated directly with the data store-1 606, the data store-2 608 now maintains utilization metrics of the data sore-1 606. Further, in response to the request, the data store-2 608 communicated utilization metrics to the client-1 602, as indicated by the solid line. This results in the client-1 602 maintaining utilization metrics for both the data store-1 606 and the data store-2 608. It is understood that a response and a request may include all, some, or none of the utilization metrics stored at the originator of the associated communication.

Similarly, the client-2 604 communicates a request for data to the data store-1 606, as indicated by the dashed line. The request includes utilization metrics for the data store-3 610 that were previously received at the first time of FIG. 5. In response to the request, the data store-1 606 provides a response that includes utilization metrics of the data store-1 606 that may be maintained by the client-2 604. Therefore, at the second time of FIG. 6, each client includes utilization metrics of each data store to which it has had direct contact; however, the data stores now include utilization metrics of other data stores to which they have not had direct contact. This allows for the eventual dissemination of data to clients of utilization information related to data stores they too have not had direct contact.

Figure 7:
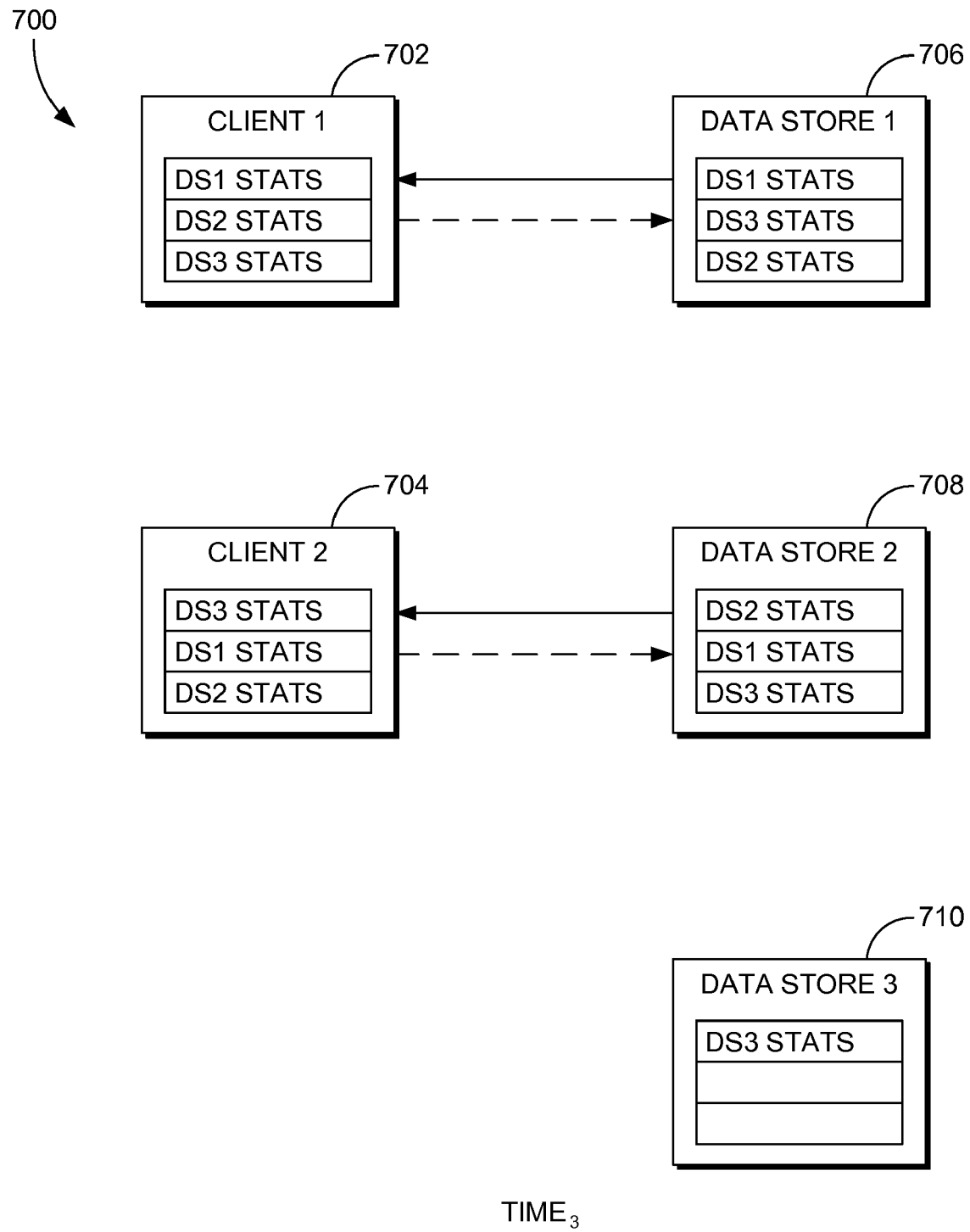
FIG. 7 depicts an exemplary environment for sharing utilization metrics at a third time in accordance with an embodiment of the present invention.

FIG. 7 depicts an exemplary environment 700 for sharing utilization metrics at a third time in accordance with an embodiment of the present invention. The environment 700 includes a client-1 702, a client-2 704, a data store-1 706, a data store-2 708, and a data store-3 710. The environment 700 is at a third time that is subsequent to the first time of FIG. 5 and the second time of FIG. 6. Therefore, utilization metrics previously communicated in the environment 500 of FIG. 5 and the environment 600 of FIG. 6 are still illustrated, but additional requests and responses have occurred as of the third time of environment 700.

As of the third time of environment 700, the client-1 702 has yet to directly communicate with the data store-3 710. However, the utilization metrics of the data store-3 710 are illustrated as being maintained at the client-1 702. This is accomplished through the data store-1 706 providing a response to the client-1 702, wherein the response included utilization metrics stored at the data store-1 706. In this example, the data store-1 706 maintains utilization metrics of the data-store-3 710 from a previous communication from the client-2 704 (i.e., the second time of FIG. 6). Therefore, even thought the client-1 702 has not previously communicated directly with the data store-3 710, a gossip protocol has allowed propagation of the utilization metrics.

In an exemplary embodiment, prior to communicating utilization metrics to another device, the communicating device (e.g., client, data store) determines if the utilization metric(s) are stale. For example, as previously discussed, a time stamp may be associated with each utilization metric so that upon the expiration or after a predefined time, the utilization metrics may be identified as being stale (i.e., expired). Similarly, a receiving device (e.g., client, data store) may check each received utilization metric to determine if it is stale or not. Stale utilization metrics may be purged or deleted. In an additional exemplary embodiment, the time stamp of a utilization metric may be evaluated by a client to determine if it is valid to be used when selecting a data store.

Figure 8:
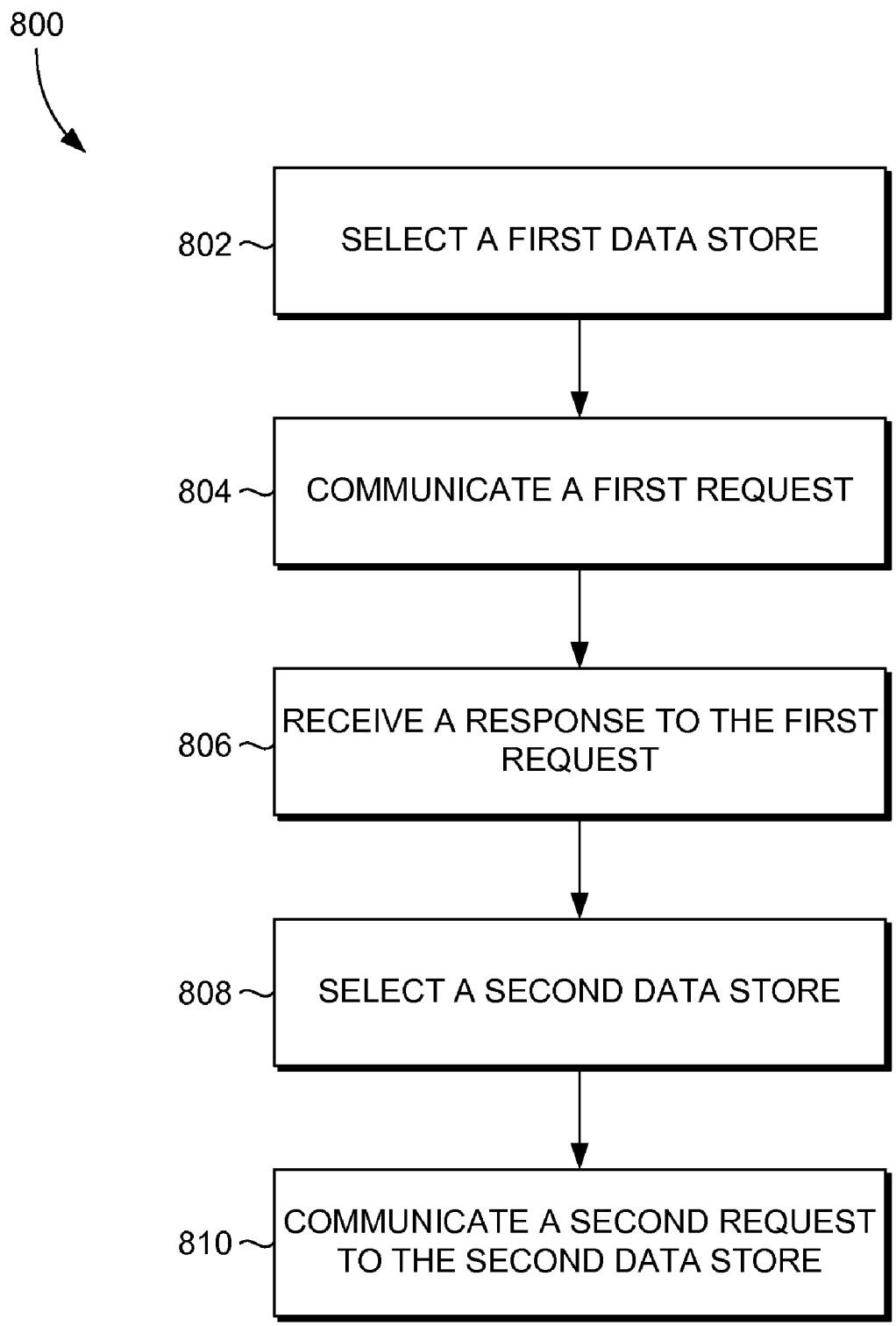
FIG. 8 depicts a method for load balancing at a client device in a distributed computing environment based on a dynamic validity period and utilization metrics in accordance with embodiments of the present invention.

FIG. 8 depicts a method 800 for load balancing a client device in a distributed computing environment based on a dynamic validity period and utilization metrics in accordance with an embodiment of the present invention. It is understood that use of terms such as a "first" and a "second" are not limiting as to the scope of the present invention, but instead are merely provided for illustrative purposes.

At a step 802, a first data store is selected. In an exemplary embodiment, a client device, such as the client device 300 of FIG. 3, selects a first data store that maintains (e.g., stores) a copy of a requested datum. The first data store may be one of a plurality of data stores that maintains a copy of the requested datum. For example, three different data stores may all store a copy of the requested datum. In an exemplary embodiment, the client device selects the first data store based on one or more utilization metrics of the first data store. The first data store may be selected as a result of having the lowest work score, a calculation that takes into account one or more utilization metrics. Similarly, the first data store may be selected as a result of a comparison of utilization metrics of the first data store relative to utilization metrics of other data stores. The utilization metrics may be stored at the client device. In an additional exemplary embodiment, the first data store may be selected based on a random or pseudo random manner.

Selection of a data store may be accomplished by various methods. For example, in an embodiment, a data store may be selected based upon the existence of a historical connection with a particular data store. Therefore, in this example, a first data store that communicated more recently than a second data store would be given preferential selection. In this example, the preferential selection may be a result of a possible unavailability of the second data store causing the absence of more recent communications. Unavailability may be a result of hardware and/or software failures at the second data store. A node that has recent unexpired utilization metrics may also be preferred as the unexpired utilization metrics may imply an ability of the data store to communicate presently.

An additional exemplary selection technique includes selecting a data store maintaining a "higher" instance of requested datum. A "higher" instance is a first copy in a chain of copies (e.g., replications) of the requested datum that is used when writing the datum originally. A higher instance traditionally has the most up to date data of an actively written datum.

Further, when datum is not actively being written ("sealed") and other information is lacking (e.g., utilization metrics) a selection technique relies on the geographically closest instance within the distributed computing system. It is understood that the above-discussed selection techniques are merely exemplary and not limiting to embodiments.

At a step 804, a first request is communicated. In an exemplary embodiment, the first request is communicated from a client device to a data store. For example, at the step 802, a client selected the first data store; therefore, at the step 804, the client may communicate a request to the first data store. In an exemplary embodiment, the request is a request for a particular datum that is maintained at the first data store. For example, a service of a distributed computing environment may request the datum. As a result, a client then selects a viable data store that maintains the datum and communicates a request for the datum, which will eventually be provided to the service.

Additionally, in an exemplary embodiment, the first request includes a valid period of a first duration. The valid period is a duration for which the request is valid and may be fulfilled. This valid period may be dynamically adjusted with each request to achieve load balancing among a plurality of data store. The first duration of the valid period may be less than a typical time-out period associated with a typical request from a client to a data store. As previously discussed, the dynamic adjustment of validity periods allows for a data store that can efficiently fulfill the request a better opportunity of doing so. Further, it is contemplated that the first request includes utilization metrics for one or more data stores.

At a step 806, a response to the first request is received. In an exemplary embodiment, the response is communicated by the first data store and received by the client. Further, in an exemplary embodiment, the response is received as a result of the first data store predicting that the request would be unable to be fulfilled within the validity period of the request. In an alternative exemplary embodiment, the response is received from the first data store as a result of the expiration of the validity period associated with the request. Further yet, an additional exemplary embodiment contemplates receiving a response as a result of the termination (e.g., system failure, software failure, power failure, communication failure) of the first data store, which would inhibit the ability of the first data store to fulfill (e.g., serve the data requested) the request. Additionally, it is contemplated that the response includes utilization metrics for one or more data stores.

At a step 808, a second data store is selected. In an exemplary embodiment, the client selects a second data store as a result of receiving the response at the step 806. The second data store is a data store that also maintains a copy of the requested datum. Therefore, the second data store is selected as an alternative to the first data store in an exemplary embodiment. Further, in an additional exemplary embodiment, the second data store is selected based on an analysis of utilization metrics of the second data store and/or other data stores that also maintain the requested data. Additionally, it is contemplated that the second data store is selected on a random basis from other data stores that maintain the requested data.

At a step 810, a second request is communicated to the second data store. In an exemplary embodiment, the client communicates a request having a valid period of a second duration to the second data store, wherein the request is for the requested datum. In an exemplary embodiment, the first duration and the second duration are for the same length of duration. In an additional exemplary embodiment, the second duration is longer than the first duration. Further, in an additional exemplary embodiment, the second duration is less in duration than the first duration. For example, in an exemplary embodiment, the first duration is a shorter period of time than the second duration as a result of the second duration being communicated to a data store with one less alternative data store (e.g., the first data store may no longer be an alternative, which reduces the number of data stores from which to choose). However, it is also contemplated that the first data store may be maintained as an alternative data store in an exemplary embodiment. Further, it is contemplated that the second request includes utilization metrics for one or more data stores.

Figure 9:
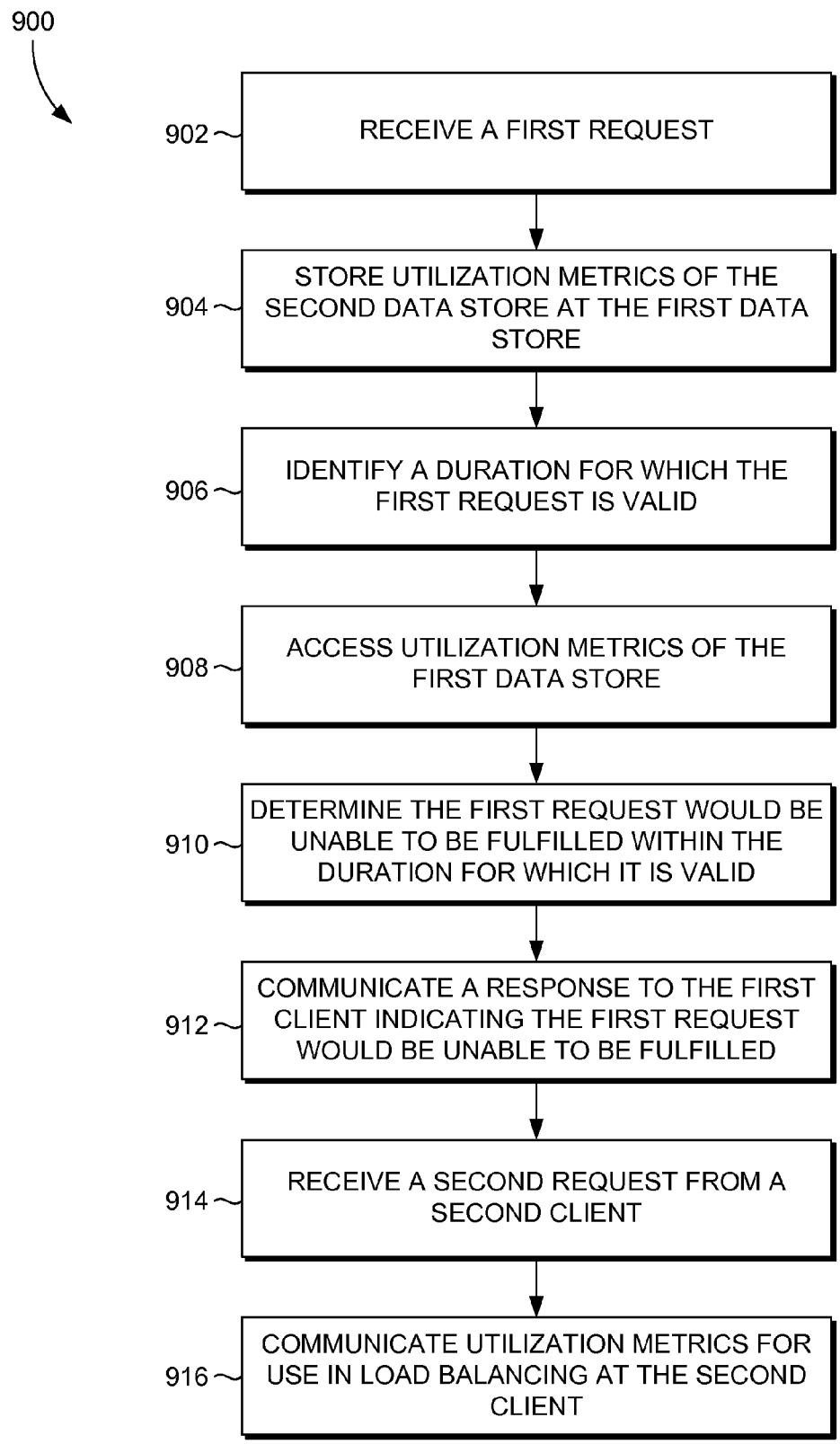
FIG. 9 depicts a method for load balancing at a client device in a distributed computing environment with utilization metrics of a plurality of data stores in accordance with embodiments of the present invention.

FIG. 9 depicts a method 900 for load balancing a client device in a distributed computing environment with utilization metrics of a plurality of data stores in accordance with an embodiment of the present invention.

At a step 902, a first request is received. In an exemplary embodiment, a first data store, such as the data store 302 of FIG. 3, receives a first request from a first client, such as the client 300 of FIG. 3. In an exemplary embodiment, the first request is a request for a particular datum that is maintained by the first data store. In an additional exemplary embodiment, the first request includes utilization metrics of one or more data stores, such as a second data store.

At a step 904, the utilization metrics received in conjunction with the first request are stored. In an exemplary embodiment, the utilization metrics are stored after determining they are not stale based on an associated time stamp. In an exemplary embodiment, the utilization metrics replace utilization metrics for the data store. For example, if the first request includes utilization metrics for a second data store, but the first data store already maintains utilization metrics for the second data store, the most recent utilization metrics for the second data store will be maintained at the first data store. The freshness (or most recent) of utilization metrics may be identified based on a time stamp.

At a step 906, a duration for which the first request is valid is identified. In an exemplary embodiment, the first request includes a validity period having a defined duration. As previously discussed, a request that includes a validity period that has expired is a request that may not be fulfilled. Therefore, in an exemplary embodiment, the first data store, upon receiving the first request, may identify a validity period associate with the first request. The duration of validity may be from the time of reception by the first data store or it may be from the time of communication by the first client.

At a step 908, utilization metrics of the first data store are accessed. In an exemplary embodiment, the first data store accesses utilization metrics of itself to make a predictive determination if the first request may be fulfilled within the validity period.

At a step 910, a determination is made that the first request would be unable to be fulfilled within the duration for which it is valid. In an exemplary embodiment, the determination is based on the accessed utilization metrics and the identified duration for which the first request is valid. In the alternative, a determination may be made (not shown) that determines the request may be fulfilled within the validity period. When such a positive determination is made, it is contemplated that a response with the requested datum is provided from the first data store to the client.

At a step 912, a response to the first client indicating the first request would be unable to be fulfilled within the duration for which the request is valid is communicated. In an exemplary embodiment, the first data store communicates to the first client that the first request will not be fulfilled. This communication may be made, in an embodiment, based on a predictive determination. In an additional embodiment, the communication may be made as a result of an expiration of the validity period. In an additional exemplary embodiment, the response includes utilization metrics of one or more data stores.

At a step 914, a second request from a second client is received. In an exemplary embodiment, the first data store receives the second request from the second client. In an exemplary embodiment, the second request is independent of the first request. Additionally, it is contemplated that the first client and the second client, in an embodiment, are different clients.

At a step 916, utilization metrics for use in load balancing at the second client are communicated. In an exemplary embodiment, the first data store communicates utilization metrics of the second data store to the second client. For example, utilization metrics of the second data store are maintained at the first data store as a result of a previously communication that provided the utilization metrics to the first data store. In an exemplary embodiment, a response to the second request communicates, from the first data store to the second client, utilization metrics for use in load balancing at the second client, wherein the utilization metrics include utilization metrics of the first data store and utilization metrics of the second data store.

Figure 10:
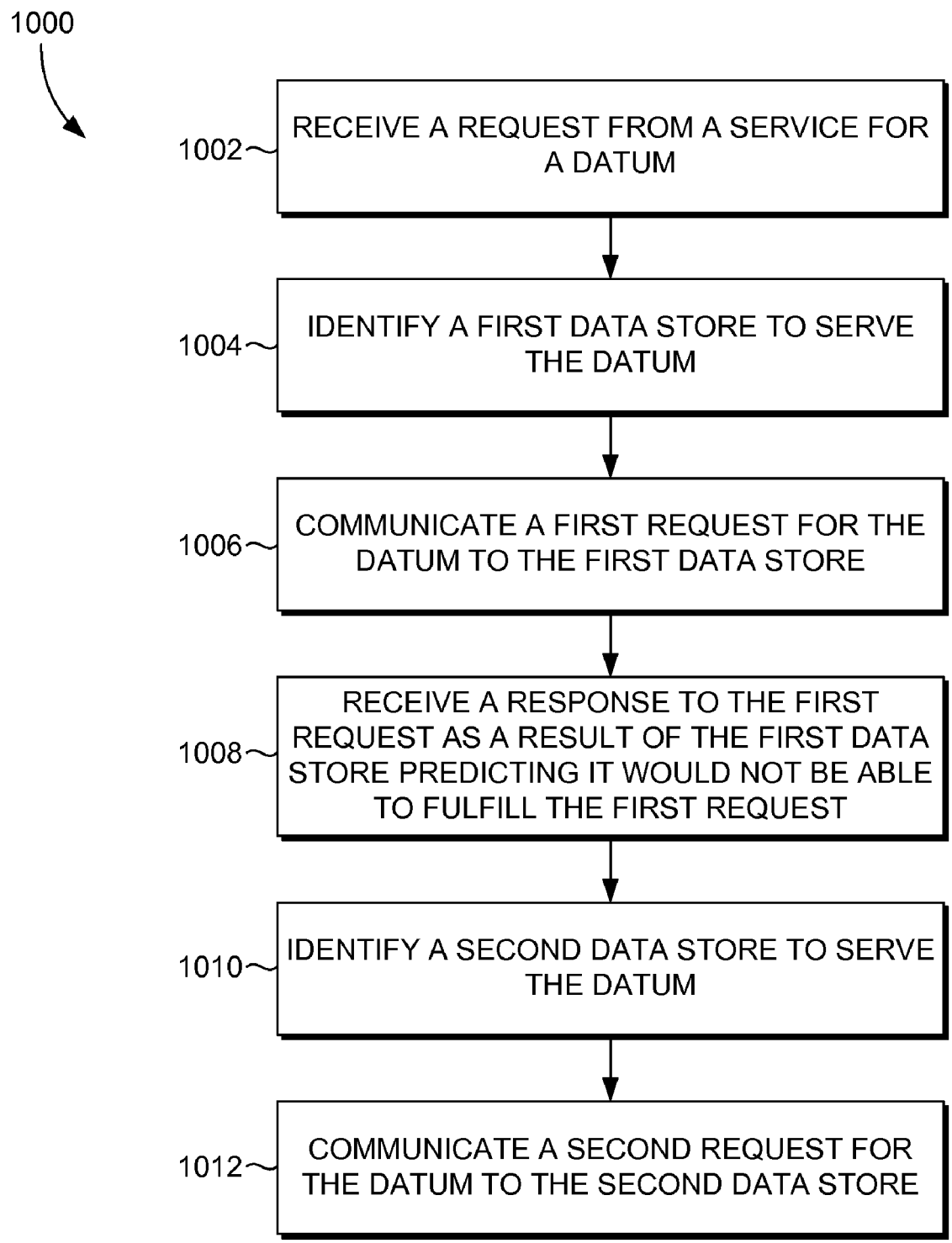
FIG. 10 depicts a method for load balancing at a client device in a distributed computing environment based on a dynamic validity duration and utilization metrics in accordance with embodiments of the present invention.

FIG. 10 depicts a method 1000 for load balancing at a client device in a distributed computing environment based on a dynamic validity duration and utilization metrics, in accordance with embodiments of the present invention.

At a step 1002, a request from a service is received. The request is a request for datum stored at a data store in communication with a client. In an exemplary embodiment, a client device in a distributed computing environment receives a request from a service for a datum. In this example, the datum is used by the service in a distributed computing environment.

At a step 1004, a first data store is identified to serve the requested datum. In an exemplary embodiment, a client device identifies a first data store from a plurality of data stores that maintain the requested datum. The identification of the first data store, in an exemplary embodiment, is performed using utilization metrics that are stored at the client device. In an additional exemplary embodiment, the first data store is selected, in this example, utilizing a random selection process to select the first data store from a plurality of data store containing the requested datum; however, additional selection techniques are contemplated as discussed herein.

At a step 1006, a first request for the datum is communicated to the first data store. For example, a client that receives a request for a datum from a service may select an appropriate data store to which forward or communicate the request (or a resulting request of the request). In an exemplary embodiment, a client receives a request for the datum and in turn forwards the request on to a data store. In an additional exemplary embodiment, a client receives a request for a datum. Upon receipt of the request for a datum, a client may generate a new request for the datum. The new request may then be communicated from the client to the selected to data store. Additionally, it is contemplated that the first request includes utilization metrics that may be stored at the first data store. Additionally, the first request, in an exemplary embodiment, includes a validity period of a first duration. The first duration may be dynamically calculated based on one or more factors known by the client device. For example, depending on a number of data stores that main a copy of the requested datum, the first duration may be set to optimize load balancing of the system. Therefore, the client, by using utilization metrics and/or a dynamic validity period is able to load balance a structured storage system in a distributed computing environment.

At a step 1008, a response to the first request is received from the first data store as a result of the first data store predicting it would not be able to fulfill the request within a timely manner. In an exemplary embodiment, a client receives a response to the first request as a result of the first data store predicting that the first request would be unable to be fulfilled within the first duration of the first request. The first response, in an exemplary embodiment, includes utilization metrics of one or more of a plurality of data stores that maintain the requested datum, such as the first data store and a second data store. As previously discussed, a data store may predict or anticipate not being able to serve a requested datum based on one or more utilization metrics of the data store. For example, the data store may access utilization metrics that describe resources that are traditionally available or that are currently available, and based on the information, the data store may make a determination that even if the request may be satisfied, fulfillment may be after a validity period has expired. Therefore, the data store may provide a response to a requesting client indicating that the request cannot be fulfilled and therefore the request should be sent to another data store. It is understood that when the request is sent to another data store, a similar but not the same request may be sent to the "another" data store. For example, header information, validity periods, and the like may change.

At a step 1010, a second data store is identified to serve the datum. In an exemplary embodiment, a client identifies a second data store to serve the datum, wherein the second data store is identified based, at least in part, on utilization metrics of at least one of a plurality of data stores. Additional selection techniques, as previously discussed herein, may be implemented to identify a second data store.

At a step 1012, a second request for the datum is communicated to the second data store. In an exemplary embodiment, the second request is associated with a validity period of a second duration. The second duration may be either longer, the same, or shorter than the first duration. In an exemplary embodiment, the duration of the second validity period is longer than the duration of the first request. For example, a client may determine that potential sources for the requested datum have fallen below a predefined performance threshold; therefore, the validity period may be extended to provide a greater chance for the second data store to fulfill the request. This may occur as a trade-off from a fast response time (i.e., shorter validity period) to a great chance of fulfillment (i.e., longer validity period).

It is contemplated that the method 1000 may continue until a data store fulfills the request or the request expires. For example, a number of data stores may be identified in a series until a data store fulfills the request. In an exemplary embodiment, a previously attempted data store is identified an additional time once alternative data stores are depleted. For example, a first data store that maintains the higher instance of the requested datum may be identified a second time once the other possible data store either predicted they would be unable to fulfill the request or otherwise timed out on the request. Similarly, it is contemplated that embodiments of the invention include continuing to identify unique or previous data stores until the request is fulfilled or a time period associated with fulfilling the request expires, which results in the request being timed out. Therefore, in exemplary embodiment, a number of data stores may be identified until either the request is fulfilled or the request times out.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for load balancing at a client device in a distributed computing environment based on a dynamic validity period and utilization metrics, the method comprising:
   at the client device, selecting a first data store from a plurality of data stores that maintain a copy of a particular datum, wherein the client device maintains utilization metrics describing utilization of resources within the first data store;
   communicating a first request having a valid period of a first duration, wherein the first request is a request to the first data store for the particular datum;
   receiving, from the first data store, a first response to the first request, wherein the first response indicates an inability of the first data store to fulfill the first request within the first duration;
   in response to receiving the first response to the first request, selecting a second data store from the plurality of data stores; and
   communicating a second request for the particular datum to the second data store, wherein the second request has a valid period with a second duration.

2. The method of claim 1, further comprising receiving, at the client device, updates of utilization metrics for each of the plurality of data stores through a gossip protocol.

3. The method of claim 2, wherein the first data store is selected from the plurality of data stores based on an analysis of the utilization metrics for each of the plurality of data stores.

4. The method of claim 1, wherein the client device is a front-end server of the distributed computing environment.

5. The method of claim 1, wherein the second duration is longer than the first duration.

6. The method of claim 1, wherein the inability of the first data store to fulfill the first request within the first duration is a predictive determination based on utilization metrics at the first data store.

7. The method of claim 1, wherein the inability of the first data store to fulfill the first request within the first duration is a based on the expiration of the first duration.

8. The method of claim 1, wherein the first response includes utilization metrics of the second data store.

9. The method of claim 8, wherein selecting the second data store from the plurality of data stores is based, at least in part, on the utilization metrics of the second data store.

10. The method of claim 1, wherein the valid period having a first duration is a time-out value associated with the first request.

11. A method for load balancing at a client device in a distributed computing environment based on a dynamic validity duration and utilization metrics, the method comprising:
   at a client device, receiving a request from a service for a datum, wherein the datum is data used as part of a service available by way of the distributed computing environment;
   identifying a first data store to serve the datum, wherein the first data store is identified from a plurality of data stores based on utilization metrics of the first data store that are stored at the client device;
   communicating a first request for the datum to the first data store, wherein the first request includes a validity period with a first duration;
   receiving a response to the first request as a result of the first data store predicting that the first request would be unable to be fulfilled within the first duration, wherein the first response includes utilization metrics of one or more of the plurality of data stores;
   identifying a second data store to serve the datum, wherein the second data store is identified based, at least in part, on utilization metrics of at least one of the plurality of data stores; and
   communicating a second request for the datum to the second data store, wherein the second request includes a validity period with a duration longer than the first duration.

12. One or more computer storage media comprising at least one memory having computer-executable instructions embodied thereon, that when executed by a computing system having a processor and memory, cause the computing system to perform a method for load balancing at a client device in a distributed computing environment based on a dynamic validity period and utilization metrics, the method comprising:
   at the client device, selecting a first data store from a plurality of data stores that maintain a copy of a particular datum, wherein the client device maintains utilization metrics describing utilization of resources within the first data store;
   communicating a first request having a valid period of a first duration, wherein the first request is a request to the first data store for the particular datum;
   receiving, from the first data store, a first response to the first request, wherein the first response indicates an inability of the first data store to fulfill the first request within the first duration;
   in response to receiving the first response to the first request, selecting a second data store from the plurality of data stores; and
   communicating a second request for the particular datum to the second data store, wherein the second request has a valid period with a second duration.

13. The media of claims 12, wherein the method further comprising receiving, at the client device, updates of utilization metrics for each of the plurality of data stores through a gossip protocol.

14. The media of claim 13, wherein the first data store is selected from the plurality of data stores based on an analysis of the utilization metrics for each of the plurality of data stores.

15. The media of claim 12, wherein the client device is a front-end server of the distributed computing environment.

16. The media of claim 12, wherein the second duration is longer than the first duration.

17. The media of claim 12, wherein the inability of the first data store to fulfill the first request within the first duration is a predictive determination based on utilization metrics at the first data store.

18. The media of claim 12, wherein the inability of the first data store to fulfill the first request within the first duration is a based on the expiration of the first duration.

19. The media of claim 12, wherein the first response includes utilization metrics of the second data store.

20. The media of claim 19, wherein selecting the second data store from the plurality of data stores is based, at least in part, on the utilization metrics of the second data store.

* * * * *